United States Patent
Wu et al.

(10) Patent No.: US 11,288,828 B2
(45) Date of Patent: Mar. 29, 2022

(54) OBJECT RECOGNITION SYSTEM BASED ON MACHINE LEARNING AND METHOD THEREOF

(71) Applicant: INDUSTRIAL TECHNOLOGY RESEARCH INSTITUTE, Hsinchu (TW)

(72) Inventors: Ming Wu, Kaohsiung (TW); Kun-Lung Tseng, New Taipei (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 30 days.

(21) Appl. No.: 16/745,640

(22) Filed: Jan. 17, 2020

(65) Prior Publication Data
US 2021/0158556 A1 May 27, 2021

(30) Foreign Application Priority Data
Nov. 21, 2019 (TW) ................ 108142344

(51) Int. Cl.
*G06T 7/00* (2017.01)
*G06T 7/593* (2017.01)
(Continued)

(52) U.S. Cl.
CPC .......... *G06T 7/593* (2017.01); *G06K 9/00201* (2013.01); *G06K 9/00624* (2013.01);
(Continued)

(58) Field of Classification Search
CPC . G06T 7/593; G06T 7/11; G06T 2207/10028; G06N 20/00; G06K 9/00201; G06K 9/00624
See application file for complete search history.

(56) References Cited

U.S. PATENT DOCUMENTS

2015/0254499 A1* 9/2015 Pang .............. G06T 7/001
382/103
2018/0348780 A1 12/2018 Zheng et al.
(Continued)

FOREIGN PATENT DOCUMENTS

| CN | 107576960 A | 1/2018 |
| CN | 108460348 A | 8/2018 |

(Continued)

OTHER PUBLICATIONS

Jafari et al., "Real-Time RGB-D based Template Matching Pedestrian Detection", arXiv:1610.00748v1 [cs.CV], Oct. 3, 2016, 8 pages.

*Primary Examiner* — Ping Y Hsieh
*Assistant Examiner* — Xiao Liu
(74) *Attorney, Agent, or Firm* — Birch, Stewart, Kolasch & Birch, LLP

(57) ABSTRACT

An object recognition system based on machine learning includes a 2D image capture module, a 3D space capture module, a data selection module, a data alignment module, a feature capture module and a detection module. The 2D image capture module captures a 2D image. The 3D space capture module captures 3D point cloud data. The data selection module performs object segmentation and depth recognition to select at least one region of interest (ROI). The data alignment module maps coordinates of the at least one ROI to coordinates of the 2D image. The feature capture module calculates features of the 2D image and extracts at least one feature of interest corresponding to the coordinates of the ROI from the features of the 2D image. The detection module obtains the feature of interest and identifies at least one object in the 2D image according to the feature of interest.

7 Claims, 3 Drawing Sheets

(51) Int. Cl.
*G06K 9/00* (2022.01)
*G06T 7/11* (2017.01)
*G06N 20/00* (2019.01)

(52) U.S. Cl.
CPC ............... *G06N 20/00* (2019.01); *G06T 7/11* (2017.01); *G06T 2207/10028* (2013.01)

(56) References Cited

U.S. PATENT DOCUMENTS

2020/0160542 A1* 5/2020 Kanzawa .................. G06T 7/11
2020/0160559 A1* 5/2020 Urtasun .................. G06K 9/629

FOREIGN PATENT DOCUMENTS

| | | | |
|---|---|---|---|
| CN | 109102547 A | | 12/2018 |
| CN | 109523552 A | | 3/2019 |
| CN | 109858450 A | | 6/2019 |
| JP | 2018205870 A | * | 12/2018 |
| TW | 201839721 A | | 11/2018 |

* cited by examiner

OBJECT RECOGNITION SYSTEM BASED ON MACHINE LEARNING AND METHOD THEREOF

This application claims the benefit of Taiwan application Serial No. 108142344, filed Nov. 21, 2019, the disclosure of which is incorporated by reference herein in its entirety.

TECHNICAL FIELD

The disclosure relates in general to an object recognition system based on machine learning and a method thereof.

BACKGROUND

Conventionally, during the process of recognizing objects in a two-dimensional (2D) color image by using a depth learning network, in the stage of selecting candidate regions in the 2D color image, a large volume of object features will be obtained by a convolutional neural network (CNN). However, the process of generating candidate regions in the 2D color image disadvantageously requires high-speed operation and consumes a large amount of time. The two disadvantages are exactly the major drawbacks of the conventional depth learning network.

According to "Front vehicle parameter recognition method based on convolutional neural networks" disclosed in the CN Patent Publication No. 105975915A, the RGB-D image inputted to the CNN is a four-channel color depth image containing color and depth information. A pre-treatment of local contrast normalization is performed on the inputted RGB-D image, and the processed data is provided to be trained by the CNN, wherein all weights are initialized as random numbers before training is performed. The training process is divided into two phases: signal forward propagation phase and error backward feedback phase. If errors between the actual output value of CNN and the expected output value remain within a pre-determined range, the CNN training is terminated, the CNN structure is maintained, and the multiplexed CNN training for the vehicle parameter recognition applicable to traffic scenario is completed. According to the above method, passengers and vehicles could be recognized through learning classification performed by the CNN. In comparison to the information of an ordinary image, the information of an RGB-D image additionally contains distance information, and therefore enhances the accuracy of object recognition to a certain degree. However, in the above method, the RGB-D could only be used to recognize objects within a shorter recognition distance and has a low degree of recognition accuracy for objects at a farther distance. Therefore, the said method may easily cause accidents when used in un-manned vehicles.

According to the "Target detection method and system based on the fusion of visual radar spatiotemporal information" disclosed in the CN Patent Publication No. 107576960A, an RGB image and a LIDAR depth image are fused to form an RGB-LIDAR image. The RGB-LIDAR images are sampled for M times, and the sampled RGB-LIDAR images are overlapped to form an overlapped RGB-LIDAR image. Plural overlapped RGB-LIDAR images are used to create an RGB-LIDAR database, which is then inputted to the depth learning network for performing machine learning to create a classification model. A corresponding decision is then made according to the analysis result obtained by the classification model. However, in the above method, the fusion of RGB-LIDAR images requires a large amount of time and operation resources. To obtain the calculation result, a large volume of RGB-LIDAR database need to be inputted to the depth learning network. The said method does not match the requirement of instant recognition.

SUMMARY

According to one embodiment, an object recognition system based on machine learning, including a 2D image capture module, a 3D space capture module, a data frame selection module, a data alignment module, a feature capture module and a detection module, is provided. The 2D image capture module captures a 2D image. The 3D space capture module captures 3D point cloud data. The data frame selection module performs object segmentation according to the 3D point cloud data and performs depth recognition to select at least one region of interest. The data alignment module maps the coordinates of the at least one region of interest to the coordinates of the 2D image. The feature capture module calculates features of the 2D image and extracts at least one feature of interest corresponding to the coordinates of the region of interest from the features of the 2D image. The detection module obtains the feature of interest and identifies at least one object in the 2D image according to the extracted feature of interest.

According to another embodiment, an object recognition method based on machine learning is provided. The method includes the following steps: capturing a 2D image; capturing 3D point cloud data; performing object segmentation according to the 3D point cloud data and performing depth recognition to select at least one region of interest; mapping the coordinates of the at least one region of interest to the coordinates of the 2D image; and calculating the features of the 2D image and extracting at least one feature of interest corresponding to the coordinates of the region of interest from the features of the 2D image; and identifying at least one object in the 2D image according to the extracted feature of interest.

The above and other aspects of the disclosure will become better understood with regard to the following detailed description of the embodiment(s). The following description is made with reference to the accompanying drawings.

Figure 1:
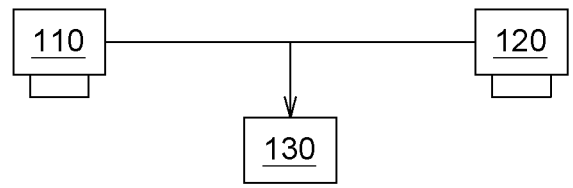
FIG. 1 is a schematic diagram of an object recognition system based on machine learning according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Detailed descriptions of the present disclosure are disclosed below with a number of embodiments. However, the disclosed embodiments are for explanatory and exemplary purposes only, not for limiting the scope of protection of the disclosure. Similar/identical designations are used to indicate similar/identical elements. Directional terms such as above, under, left, right, front or back are used in the following embodiments to indicate the directions of the accompanying drawings, not for limiting the present disclosure.

According to an embodiment of the present disclosure, an object recognition system based on machine learning and a method thereof are provided. For example, depth learning is performed using a convolutional neural network (CNN), and training is performed in a depth learning network to create a classification model. The CNN is formed of one or more than one convolutional layer and a fully connected layer at the top thereof, and also includes association weights and a pooling layer, such that the CNN could perform operation by using the 2D structure of the inputted data. In comparison to other depth learning structures, the CNN has better performance in terms of image and object recognition, requires fewer parameters, and produces a higher degree of accuracy of object recognition, such as greater than 90%. The CNN could further be divided into regional CNN (R-CNN), fast regional CNN (Fast R-CNN) and faster regional CNN (Faster R-CNN). The inputted data is divided into plural regions, and each region is allocated to a corresponding category. Then, all regions are combined together to complete the detection of the target object.

According to the conventional object recognition method based on machine learning, the CNN directly performs machine learning on a 2D RGB image, an RGB-D image or a fused RGB-LIDAR to extract object features. In order to obtain a calculation result, the convention method requires a high-speed operation and a large amount of time, and therefore could not reduce the operation time.

Conversely, according to the object recognition system and method based on machine learning of the present disclosure, the computing module firstly performs machine learning by using CNN, K-means clustering method or clustering structure based on SVM and K-means to perform object segmentation on the 3D point cloud data and perform depth recognition to obtain at least one roughly selected region of interest (referred as "rough region of interest" hereinafter). The quantity of selected regions of interest could be one or more than one, and the present disclosure is not limited thereto. Then, according to coordinates of the "rough region of interest", feature extraction is performed on at least one feature of interest corresponding to the "rough region of interest" in the 2D image and the selected region of interest is fine-tuned (the refined region of interest is referred as "fine region of interest" hereinafter), such that the computing module could recognize the category of the object in the "fine region of interest" more quickly, and the operation time could therefore be effectively reduced to be, for example, less than 90 microseconds (ms).

Referring to FIG. 1, a schematic diagram of an object recognition system based on machine learning 100 according to an embodiment of the present disclosure is shown. The object recognition system based on machine learning 100 includes a 2D image capture module 110, a 3D space capture module 120 and a computing module 130. The 2D image capture module 110, such as a camera, captures a 2D image 111. The 3D space capture module 120, such as an optical radar (LIDAR) module or a 3D optical scanning module, captures 3D point cloud data 121 to create an object model in a 3D space by using time-of-flight or triangulation technology. In another embodiment, the 3D space capture module 120 projects a structured light in the target object, and the 2D image capture module 110 captures a 2D image 111 with a structured light to generate a depth image data. In an embodiment, the computing module 130 could be realized by a software, a computer or a processor performing the software.

The computing module 130 synchronically obtains the 2D image 111 and the 3D point cloud data 121 captured by the 2D image capture module 110 and the 3D space capture module 120 respectively, and performs object segmentation and depth recognition on the 3D point cloud data 121 through machine learning. Meanwhile, the computing module 130 could further recognize at least one object in the 2D image 111 corresponding to the region of interest through machine learning to determine the category and distance of the object. Descriptions of specific architecture related to the computing module 130 could be obtained with reference to FIG. 2.

Figure 2:
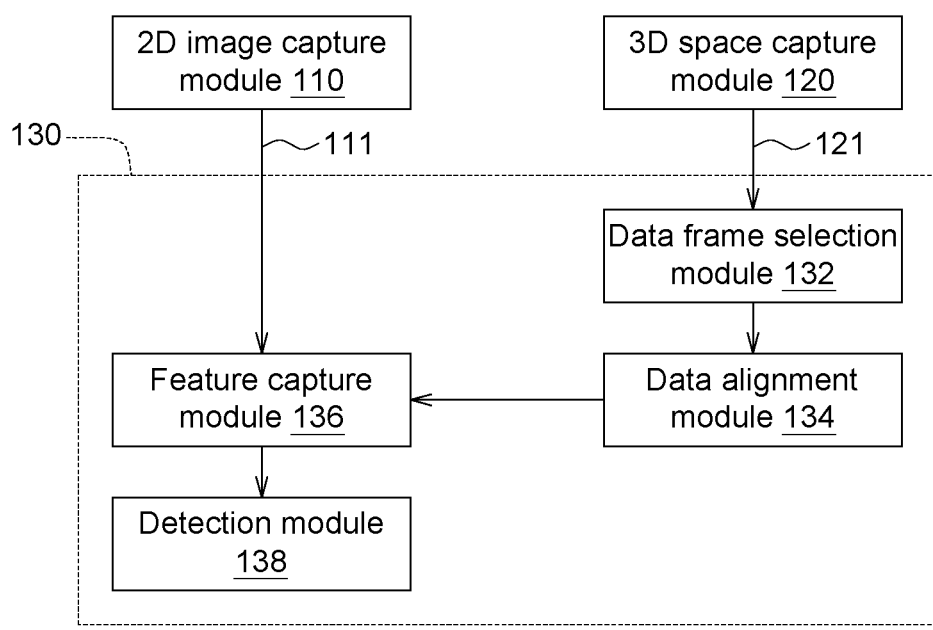
FIG. 2 is a schematic diagram of a specific architecture of an object recognition system based on machine learning according to an embodiment of the present disclosure.

Referring to FIG. 2, a schematic diagram of a specific architecture of an object recognition system based on machine learning 100 according to an embodiment of the present disclosure is shown. The computing module 130 includes a data frame selection module 132, a data alignment module 134, a feature capture module 136 and a detection module 138. The data frame selection module 132 performs object segmentation according to the 3D point cloud data 121 and performs depth recognition to select at least one region of interest. The data alignment module 134 maps the coordinates of the region of interest to the coordinates of 2D image 111. The feature capture module 136 calculates features of the 2D image and extracts at least one feature of interest corresponding to the coordinates of the region of interest from the features of the 2D image. The detection module 138 obtains the feature of interest and identifies at least one image in the 2D image 111 according to the extracted feature of interest.

In an embodiment, the data frame selection module 132 could use a feature detector to select some local features from the 3D point cloud data 121, and could combine selective search, CNN model and support vector machine (SVM) classifier to perform machine learning to locate possible positions of the target object. Selective search could take the spatial distribution of the point cloud, distance similarity, size similarity and filling similarity into consideration to separate local features from the point cloud data to form at least one region of interest. The quantity of selected regions of interest could be one or more than one, and the present disclosure is not limited thereto. Meanwhile, since the data frame selection module 132 only needs to roughly select the region of interest of the possible positions of the target object without having to determine object features, the operation time is relatively reduced.

Besides, the data alignment module 134 maps the coordinates of the region of interest to the coordinates of the 2D image 111, such that the feature capture module 136 could obtain a correspondence relation between the coordinates of the region of interest and the coordinates of the 2D image 111. That is, the coordinates (x, y, z) in the 3D space are mapped to the coordinates (pixel x, pixel y) of each pixel in the 2D image 111, wherein pixel x represents the pixel corresponding to the X-axis, pixel y represents the pixel corresponding to the Y-axis, and z represents the depth information. In the present embodiment, since the data alignment module 134 only needs to map the coordinates of the region of interest to the coordinates of the 2D image 111 without having to map all 3D point cloud data 121 to the coordinates of the 2D image 111, the operation time is relatively reduced.

Furthermore, after the feature capture module 136 obtains the correspondence relation between the coordinates of the region of interest and the coordinates of the 2D image 111, the feature capture module 13 calculates features of the 2D image and extracts at least one feature of interest corresponding to the coordinates of the region of interest from the features of the 2D image. That is, to extract a feature of interest from the 2D image 111 corresponding to the "rough region of interest", the feature capture module 136 only analyzes a local region of the 2D image 111.

Again, after the detection module 138 obtains the feature of interest, the detection module 138 identifies an object in the 2D image 111 according to the extracted feature of interest. Meanwhile, to reduce the scope of the "rough region of interest", the detection module 138 could further precisely locate a fine region of interest corresponding to the object in the 2D image 111 according to the result of object segmentation.

Figure 3:
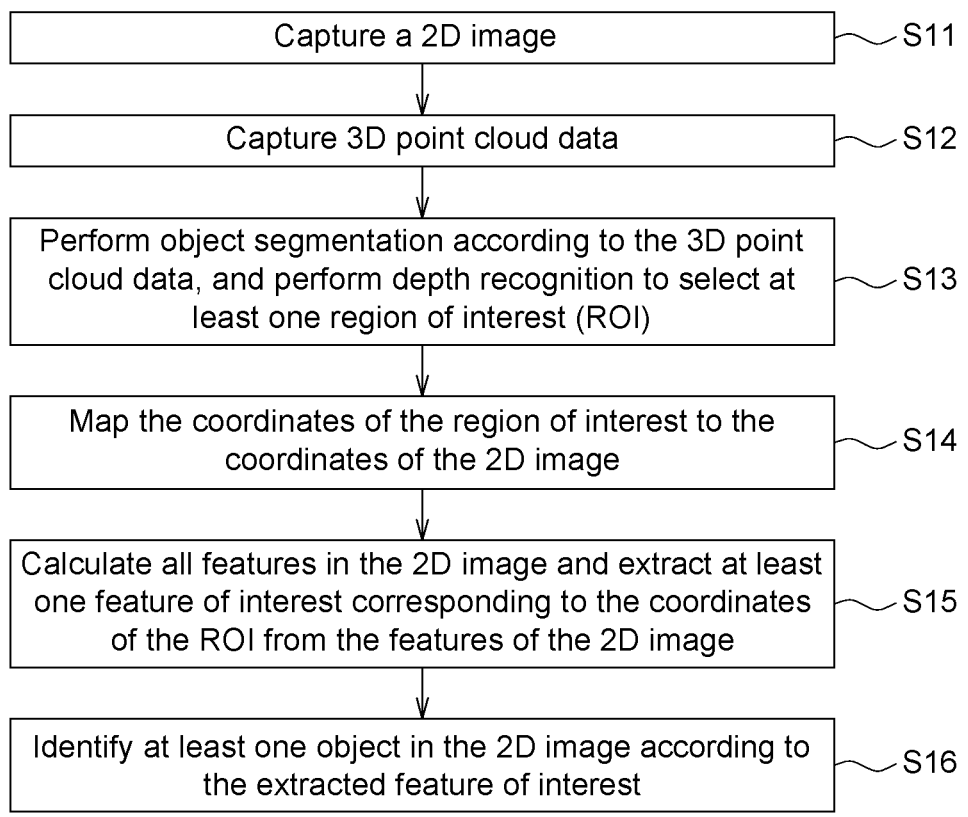
FIG. 3 is a schematic diagram of an object recognition method based on machine learning according to an embodiment of the present disclosure.

Referring to FIG. 3, a schematic diagram of an object recognition method based on machine learning according to an embodiment of the present disclosure is shown. The object recognition method includes steps S11-S17. In step S11, a 2D image 111 is captured. In step S12, 3D point cloud data 121 is captured. In step S13, object segmentation is performed according to the 3D point cloud data 121, and depth recognition is performed to select at least one region of interest (ROI). The quantity of selected regions of interest could be one or more than one, and the present disclosure is not limited thereto. In step S14, the coordinates of the ROI are mapped to the coordinates of the 2D image 111. In step S15, all features in the 2D image 111 are calculated, and at least one feature of interest corresponding to the coordinates of the ROI is extracted from the features of the 2D image 111. In step S16, at least one object in the 2D image 111 is identified according to the extracted feature of interest.

Figure 4:
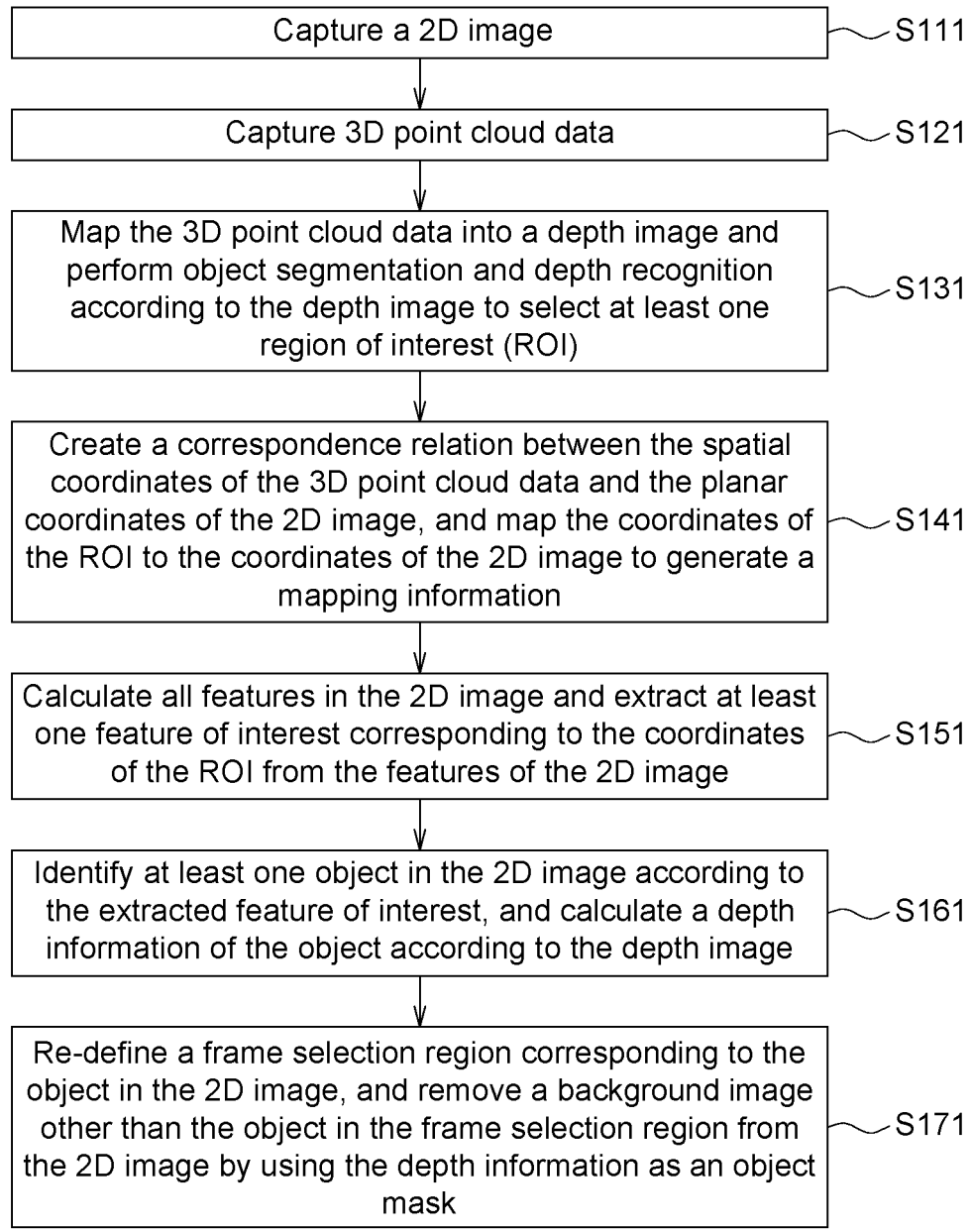
FIG. 4 is a schematic diagram of detailed steps of the object recognition method based on machine learning of FIG. 3.

Refer to FIG. 2 and FIG. 4. FIG. 4 is a schematic diagram of detailed steps of the object recognition method based on machine learning of FIG. 3. The object recognition method includes steps S111-S171. In step S111, a 2D image 111 is captured. In step S121, 3D point cloud data 121 is captured. In step S131, the 3D point cloud data 121 is converted into a depth image by the 3D space capture module 120, and object segmentation and depth recognition are subsequently performed according to the depth image to select at least one region of interest (ROI). The quantity of selected region of interest could be one or more than one, and the present disclosure is not limited thereto. In step S141, a correspondence relation between the spatial coordinates of the 3D point cloud data 121 and the planar coordinates of the 2D image 111 is created by the data alignment module 134, and the coordinates of the ROI are subsequently mapped to the coordinates of the 2D image 111 to generate a mapping information. In step S151, after the 2D image 111 and the mapping information are obtained by the feature capture module 136, all features in the 2D image are calculated (there is no need to analyze what do the features stand for), and at least one feature of interest corresponding to the coordinates of the ROI is extracted from the features of the 2D image 111 (there is no need to extract all features). In step S161, at least one object in the 2D image 111 is identified by the detection module 138 according to the extracted feature of interest, and depth information of the object is further calculated by the detection module 138 according to the depth image. In step S171, after the depth information is obtained by the detection module 138, a frame selection region corresponding to the object in the 2D image 111 could be re-defined (the re-defined frame selection region is a "fine region of interest"), and a background image other than the object in the re-defined frame selection region is removed from the 2D image 111 by using the depth information as an object mask, wherein the background image is an image outside the outline of the object.

In step S171, since a background image other than the object (i.e., outside the outline of the object) in the frame selection region has been removed from the 2D image 111, the feature of interest of the object becomes more evident, interference on object recognition by the background image of the 2D image 111 could be excluded, and the accuracy of object recognition could be increased to be, for example, above 93%.

According to the object recognition system and method based on machine learning disclosed in above embodiments of the present disclosure, a 2D image recognition is provided with 3D point cloud data, which is further used to assist with the recognition of the 2D image by the data frame selection module. With the 3D point cloud data, a feature of interest corresponding to the region of interest could be directly selected in the 2D image. By doing so, it is not necessary to obtain the recognition data of the 2D image, convert the recognition data of the 2D image into 3D point cloud data and compare the 3D point cloud data with the database, nor is it necessary to combine the depth data D with the RGB data of the 2D image to form an RGB-D image or fuse the LIDAR data with the RGB data of the 2D image to form an RGB-LIDAR image. Thus, the operation time could be effectively reduced. Meanwhile, the object recognition system and method of the present embodiment could be used in the field of un-manned vehicle or automated driving, not only increasing the speed of object recognition but further increasing the accuracy of object recognition and matching the requirement of instant recognition.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. An object recognition system based on machine learning, comprising:
   a two-dimensional (2D) image capture module configured to capture a 2D image;
   a three-dimensional (3D) space capture module configured to capture 3D point cloud data;
   a data frame selection module configured to perform object segmentation according to the 3D point cloud data and perform depth recognition to select at least one region of interest, wherein the data frame selection module only converts the 3D point cloud data of the at least one region of interest into a depth image and only performs the object segmentation according to the depth image corresponding to the at least one region of interest without converting between the 2D image and the 3D point cloud data;
   a data alignment module configured to map coordinates of the at least one region of interest to coordinates of the 2D image;
   a feature capture module configured to calculate features of the 2D image and extract at least one feature of interest corresponding to the coordinates of the region of interest from the features of the 2D image; and a detection module configured to obtain the at least one feature of interest and identify at least one object in the 2D image according to the at least one feature of interest, and the detection module re-defines a frame selection region corresponding to the at least one object in the 2D image to reduce a scope of the at least one region of interest and removes a background image other than the at least one object in the at least one region of interest from the 2D image by using the depth image of the object as an object mask.

2. The object recognition system according to claim 1, wherein the data alignment module creates a correspondence relation between spatial coordinates of the 3D point cloud data and planar coordinates of the 2D image for mapping the coordinates of the region of interest to the coordinates of the 2D image to generate a mapping information.

3. The object recognition system according to claim 1, wherein the detection module calculates depth information of the at least one object according to the depth image.

4. An object recognition method based on machine learning, comprising:

capturing a two-dimensional (2D) image;

capturing three-dimensional (3D) point cloud data;

performing object segmentation according to the 3D point cloud data and performing depth recognition to select at least one region of interest, wherein only converting the 3D point cloud data of the at least one region of interest into a depth image and only performing the object segmentation according to the depth image corresponding to the at least one region of interest without converting between the 2D image and the 3D point cloud data;

mapping coordinates of the at least one region of interest to coordinates of the 2D image; and calculating features of the 2D image and extracting at least one feature of interest corresponding to the coordinates of the region of interest from the features of the 2D image;

identifying at least one object in the 2D image according to the extracted feature of interest;

re-defines a frame selection region corresponding to the at least one object in the 2D image to reduce a scope of the at least one region of interest; and removing a background image other than the object in the region of interest from the 2D image by using the depth image of the object as an object mask.

5. The object recognition method according to claim 4, comprising creating a correspondence relation between spatial coordinates of the 3D point cloud data and planar coordinates of the 2D image for mapping the coordinates of the region of interest to the coordinates of the 2D image to generate a mapping information.

6. The object recognition method according to claim 4, further comprising calculating a depth information of the at least one object according to the depth image.

7. A non-transitory computer readable medium storing a program causing a processor to execute a object recognition method based on machine learning, wherein the object recognition method comprises:

capturing a two-dimensional (2D) image;

capturing a three-dimensional (3D) point cloud data;

performing object segmentation according to the 3D point cloud data and performing depth recognition to select at least one region of interest, wherein only converting the 3D point cloud data of the at least one region of interest into a depth image and only performing the object segmentation according to the depth image corresponding to the at least one region of interest without converting between the 2D image and the 3D point cloud data;

mapping coordinates of the at least one region of interest to coordinates of the 2D image;

calculating features of the 2D image and extracting at least one feature of interest corresponding to the coordinates of the region of interest from the features of the 2D image;

identifying at least one object in the 2D image according to the extracted feature of interest;

re-defining a frame selection region corresponding to the at least one object in the 2D image to reduce a scope of the at least one region of interest; and removing a background image other than the object in the region of interest from the 2D image by using the depth image of the object as an object mask.

* * * * *